INVENTOR.
JAMES L. ATKINSON
BY Edward Dugas
AGENT

United States Patent Office 3,411,838
Patented Nov. 19, 1968

3,411,838
ELECTROSTATIC SUPPORT
James L. Atkinson, La Mirada, Calif., assignor to North American Rockwell Corporation, a corporation of Delaware
Filed Mar. 7, 1966, Ser. No. 532,371
7 Claims. (Cl. 308—10)

This invention relates to an electrostatic support and more particularly to a semi-passive electrostatic support for supporting the rotor of a gyroscope.

In the prior art of electrostatic supports there presently exists two major categories for maintaining the rotor or supported member, in the presence of disturbing forces, centered or servoed between the supporting electrodes. These categories are "active compensation" and "passive compensation." One technique used under the active compensation category is the two-frequency scheme in which one frequency is used to sense position and the other to control position. A two-frequency scheme is disclosed in U.S. Patent No. 3,003,356, entitled, "Free-Gyro Systems for Navigation or the Like," by A. T. Nordsieck. The other technique used in active compensation is the cancellation or unidirectional scheme in which position information is separated from control information. A cancellation scheme is disclosed in U.S. patent application Ser. No. 443,539, entitled "Electrostatic Bearing," filed Mar. 29, 1965, by James L. Atkinson, the inventor of the present device.

The active compensation support systems require complex electronics which create packaging, reliability, power and adjustment problems.

In passive compensating supports no attempt is made to determine position information. One such system is disclosed in U.S. Patent No. 3,098,679, entitled "Passive Control Circuit for Electrostatic Bearing" by William F. De Boice. The disadvantage of this type of support is that it works only in a fractional "g" environment, that is, it cannot function under heavy "g" environments such as in experienced in missiles and other aircraft.

The semi-passive support of the present invention blends together the advantages of both the active and passive categories wherein no attempt is made to sense position explicitly. Amplifiers, such as may be found in an active system are used to decouple stiffness and damping which are closely interdependent in the strictly passive system. This results in a set of electronics which uses a minimum of electrical components.

It is therefore an object of this invention to provide an improved electrostatic support system.

Another object of this invention is to provide a semi-passive electrostatic support system which combines the advantages of passive and active support systems.

Still another object of the present invention is to provide an electrostatic support system which utilizes negative impedance converters.

These and other objects of the invention will become more apparent from the following description when taken in conjunction with the drawings in which.

Figure 1:
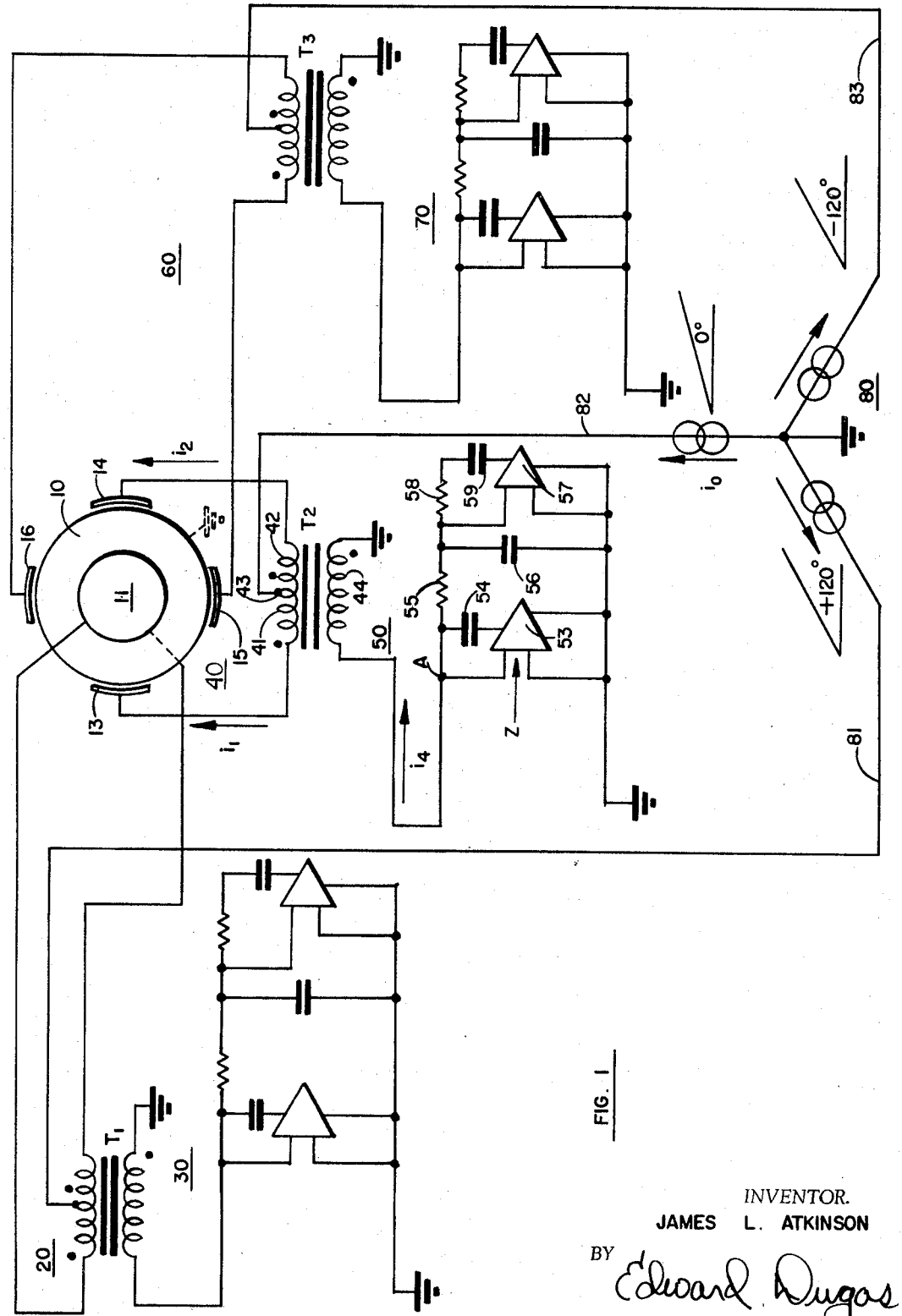
FIG. 1 illustrates an electrostatic support system embodying the invention.

In FIG. 1 a three-axis support for an electrostatic gyroscope having a conductive spherical rotor 10 is shown. The sphere 10 is electrostatically supported by electrode plates 15 and 16 in one direction, electrode plates 13 and 14 in another direction, and electrode plates 11 and 12 (not shown) in still another direction so as to provide a three-dimensional support. In the specific embodiment illustrated the above respective pairs of plates are shown symbolically as being circular and equally spaced around the periphery of the sphere 10. It will be understood that the plates may take various shapes and that such would be only a function of design. In addition, the inner surfaces of the plates will preferably be concave and concentric with the center of the sphere 10. Plates 11 through 16 have inner surfaces which define a sphere which is slightly larger and concentric with sphere 10.

The power supporting circuit 20 is connected to plates 11 and 12 for electrostatically supporting the sphere 10 between plates 11 and 12. A sensing and servo circuit 30 is coupled by the transformer $T_1$ to the power supporting circuit 20 so as to effect centering of the sphere 10 between the plates 11 and 12. That is, if the sphere 10 tends to not be centered between plates 11 and 12, the sensing and centering circuit 30 will effect application of a signal through the power circuit 20 to the plates 11 and 12 so as to center the sphere therebetween. The electrodes 13 and 14 are connected to the power supporting circuit 40 for supporting the sphere 10 between the electrodes 13 and 14. The sensing and servo circuit 50 is coupled by the transformer $T_2$ to the power supporting circuit 40 so as to sense when the sphere 10 is not centered between the electrodes 13 and 14 and in response thereto to apply a signal to the power circuit 40 to effect the centering of the sphere 10 between the electrodes 13 and 14.

The electrodes 15 and 16 are connected to the power supporting circuit 60 for supporting the sphere 10 between electrodes 15 and 16. The sensing and servo circuit 70 is coupled through the transformer $T_3$ to the power circuit 60 so as to effect centering of the sphere 10 between electrodes 15 and 16.

The sphere 10 is an electroconductive sphere made of some material such as aluminum. In the preferred form shown in the drawing, a three-phase constant current power current supply 80 through conductors 81, 82 and 83 provides power in three phases through the power circuits 20, 40 and 60 to electrostatically suspend the sphere 10. More specifically, conductor 81 is connected to provide a current to the center tap of the secondary winding of transformer $T_1$ of circuit 20. Conductor 82 provides a current 120 degrees out of phase with conductor 81 and conductor 83 and is connected to the center tap of the secondary winding of transformer $T_2$ of circuit 40. Conductor 83 provides a current which is 120 degrees out of phase with the current in conductors 81 and 82, and is connected to the center tap of the secondary winding of transformer $T_3$ of circuit 60.

Thus, by the connections between the three-phase power supply 80 and the power circuits 20, 40 and 60, sufficient voltage appears between the electrode plates and the sphere so as to normally, with the aid of sensing and servo circuits 30, 50 and 70, to electrostatically support the sphere in three dimensions.

Means well known to those skilled in the art may be used to rotate the sphere 10 at a high rate of speed such that it displays the characteristics of a gyroscope. Such means for rotation form no part of the present invention.

The power circuit 40 and the sensing and servo circuit 50 which are utilized to electrostatically support and center the sphere 10 between plates 13 and 14 are numbered in detail in the drawing.

Since the power circuits 20 and 60 along with sensing and servo circuits 30 and 70, respectively, are identical to the power supporting circuit 40 and the sensing circuit 50, respectively, only the latter will be described in detail.

As shown in FIG. 1, the secondary of transformer $T_2$ is center tapped at 43 so as to divide this winding into two equal windings 41 and 42. These windings are poled as shown by the dots and have their outer ends electrically connected to the plates 13 and 14.

Due to the A.C. currents applied through conductors 81, 82 and 83 to their respective plates, the conductive sphere 10 will be maintained at A.C. ground. Thus, a current from conductor 82 will flow through windings 41 and 42, plates 13 and 14, respectively, and thence through the conductive sphere 10 back to ground. When the sphere 10 is centered or equidistant from plates 13 and 14, the two branch currents $i_1$ and $i_2$ passing through windings 41 and 42, respectively, will be equal. When these currents are equal and the sphere 10 is centered between the plates there will be no current induced back into the primary winding 44 of transformer $T_2$.

The sensing and servo circuit 50 includes the primary winding 44 which has one end grounded and the other end connected to the point A. A non-inverting amplifier 53 has its input connected to point A and is electrically referenced to ground. A feedback capacitor 54 is connected from the output of amplifier 53 to the point A. The input of the non-inverting amplifier 57 is connected to point A by resistor 55. Amplifier 57 is electrically referenced to ground. Capacitor 56 is connected from the input of amplifier 57 to ground. Capacitor 59 and resistor 58 are serially connected from the output of amplifier 57 to the input of amplifier 57. The impedance from point A to ground looking towards the amplifiers 53 and 57 is designated Z. The amplifiers 53 and 57 in combination with their associated passive capacitors and resistors form two negative impedance converters, the function of which will be hereinafter described.

The electrostatic support system is inherently unstable and will not support the sphere 10 unless a proper stabilization device or circuit is connected to point A.

When the sphere 10 is disturbed by some external force it will operate as a balanced modulator providing a double size band suppressed carrier output signal at point A.

In the present invention it may be shown that by providing the correct value of Z from the point A to ground, the system will be stable and provide for the centering of the sphere between the plates for a wide range of applied force. It has also been found that utilization of the present invention provides a capability of independent adjustment of stiffness and damping. As will be shown, Z is not positive real; this condition requires that negative impedance converters be used to synthesize the driving point impedance Z.

*Definition of terms*

The following terms are now defined and will be used throughout the remaining description of the invention.

$V_1$=the voltage across winding 41,
$V_2$=the voltage across winding 42,
$V_3$=the voltage between the center tap 43 and ground,
$V_4$=the voltage across winding 44,
$N_{41}/N_{42}$=the turns ratio between windings 41 and 42; it equals 1 for the specific embodiment shown,
$N_{44}/N_{41}$=the turns ratio between winding 44 and winding 41,
$C_0$=the capacitance between electrode 13 and sphere 10, which is equal to the capacitance between electrode 14 and sphere 10, when the sphere is centered between the electrodes,
$C_{13}$=the capacitance between electrode 13 and sphere 10, when the sphere is not centered between electrodes 13 and 14,
$i_0 = i_1 + i_2$ where $i_1$ is the current through winding 41 and $i_2$ is the current through winding 42,
$i_4$=the current through winding 44,
$\epsilon_0$=relative displacement of the sphere from its central position,
$K$=damping factor,
$K_d$=stiffness factor,
$s$=Laplace operator,
$\omega_c$=radian frequency of supply 80.

*Analysis*

For simplicity of analysis, it is assumed that transformer $T_2$ is ideal, that is, that $N_{41}=N_{42}$, magnetizing inductance is infinite and leakage inductance and losses are zero. For this transformer $$i_1 - i_2 + \frac{N_{44}}{N_{41}} i_4 = 0 \tag{1.1}$$

$$V_4 = \frac{N_{44}}{N_{41}} V_1 \tag{1.2}$$

Taking the Kirchhoff's equation around the loop defined by $i_1$ we obtain:

$$V_3 = V_1 + \frac{i_1}{C_{13}s} \tag{1.3}$$

$$\frac{1}{C_{13}} = \frac{1}{C_0}(1-\epsilon_0) \tag{1.4}$$

Substituting Equation 1.4 into Equation 1.3, we obtain:

$$V_3 = V_1 + \frac{i_1}{C_0 s} - \frac{i_1 \epsilon_0}{C_0 s} \tag{1.5}$$

The equation for the loop defined by $i_2$ is similar to Equation 1.5.

$$V_3 = V_2 + \frac{i_2}{C_0 s} + \frac{i_2 \epsilon_0}{C_0 s} \tag{1.6}$$

Solving Equation 1.5 and Equation 1.6 for $V_1$ $$V_1 = \frac{i_2 - i_1}{2C_0 s} + \frac{i_2 + i_1}{2C_0 s}\epsilon_0 \tag{1.7}$$

Substituting the value of $V_1$ in Equation 1.2 we obtain:

$$V_4 = \frac{N_{44}}{N_{41}}\left[\frac{i_2-i_1}{2C_0 s} + \frac{i_2+i_1}{2C_0 s}\right]\epsilon_0 \tag{1.8}$$

Since $$i_2 - i_1 = \frac{N_{44}}{N_{41}} i_4 \text{ and } i_2 + i_1 = i_0$$

the Equation 1.8 may be rewritten as $$V_4 = \left(\frac{N_{44}}{N_{41}}\right)^2 \frac{i_4}{2C_0 s} + \frac{N_{44}}{N_{41}} \frac{i_0}{2C_0 s}\epsilon_0 \tag{1.9}$$

Noting that $$V_4 = -i_4 Z \tag{1.10}$$

and substituting Equation 1.9 into Equation 1.10 and rearranging $$\frac{N_{44}}{N_{41}} i_4 = -\frac{1}{\left(\frac{N_{41}}{N_{44}}\right)^2 Z 2 C_0 s 1 + 1} i_0 \epsilon_0 \tag{1.11}$$

*Normalized force equation and dummy transfer function*

It is now necessary to obtain the net normalized force $F_n$ acting on the sphere from plates 13 and 14.

$$F_n = i_2^2 - i_1^2 \tag{2.1}$$

such that $$F_n = i_0 \frac{N_{44}}{N_{41}} i_4 \tag{2.2}$$

Substituting Equation 1.11 into Equation 2.2

$$F_n = -\frac{1}{ZC_e s + 1} i_0^2 \epsilon_0 \tag{2.3}$$

where $$C_e\Delta = \left(\frac{N_{41}}{N_{44}}\right)^2 2C_0$$

From Equation 2.3 a dummy transfer function $N(s)$ may be obtained:

$$N(s) = \frac{-1}{ZC_e s + 1} \quad (2.4)$$

Figure 2:
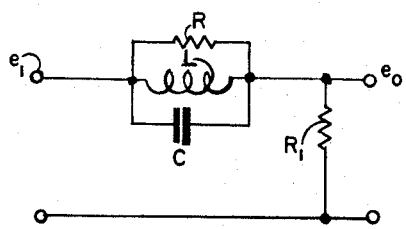
FIG. 2 is a passive circuit which may be used with the present invention.

In the servo art stability or damping can be achieved by a simple lead compensation, therefore, $N(s)$ will take the form of an "A.C." notch network as illustrated in FIG. 2.

The transfer function of the network of FIG. 2 is $$N(s) = \frac{e_0}{e_i} = \frac{LCs^2 + \frac{L}{R}s + 1}{LCs^2 + \left(\frac{L}{R_1} + \frac{L}{R}\right)s + 1} \quad (2.5)$$

Let $$\frac{L}{R} = \frac{1}{\omega_o Q} \quad (2.6)$$

and $$\left(\frac{L}{R_1} + \frac{L}{R}\right) = \frac{K}{\omega_o Q} \quad (2.7)$$

and $$LC = \frac{1}{\omega_o^2} \quad (2.8)$$

To increase the stiffness of the circuit an additional gain factor $K_d$ is added such that $$N(s) = K_d \frac{\frac{s^2}{\omega_o^2} + \frac{1}{Q}\frac{s}{\omega_o} + 1}{\frac{s^2}{\omega_o^2} + \frac{K}{Q}\frac{s}{\omega_o} + 1} \quad (2.9)$$

Solving Equations 2.4 and 2.9 for Z we obtain:

$$Z = -\frac{1 + K_d}{K_d C_e s} \cdot \frac{\frac{s^2}{\omega_o^2} + \frac{K_d + K}{1 + K_d}\frac{1}{Q}\frac{s}{\omega_o} + 1}{\frac{s^2}{\omega_o^2} + \frac{1}{Q}\frac{s}{\omega_o} + 1} \quad (2.10)$$

Thus Z is not positive real and must be synthesized with negative impedance converters.

*Synthesis of Z*

From Z extract the negative shunt capacitance $$C_f = \frac{K_d C_e}{1 + K_d} \quad (3.1)$$

Thus $$Y_2 = Y + C_f s \text{ where } Y = \frac{1}{Z} \quad (3.2)$$

$$Y_2 = \frac{C_f(K-1)\omega_o}{(1+K_d)Q} \cdot \frac{s^2}{s^2 + \left(\frac{K_d + K}{1 + K_d}\right)\frac{\omega_o}{Q}s + \omega_o^2} \quad (3.3)$$

Figure 3:
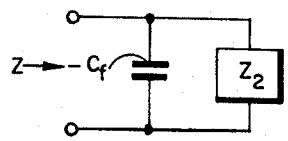
FIG. 3 is a schematic presentation of an equivalent circuit which may be used with the invention.

FIG. 3 is the schematic equivalent of Equation 3.2. From this equivalent circuit $$Z_2 = \frac{1}{Y_2} = K_2 \frac{s^2 + as + b}{s^2} = K_2 Z_3 \quad (3.4)$$

Where $$K_2 = \frac{(1+K_d)Q}{(K-1)C_f \omega_o} \quad (3.5)$$

$$a = \frac{K_d + K}{1 + K}\frac{\omega_o}{Q} \quad (3.6)$$

$$b = \omega_o^2 \quad (3.7)$$

$$Z_3 = \frac{s^2 + as + b}{s^2} \quad (3.8)$$

Let $$Z_3 = 1 + \frac{as + b}{s^2} = 1 + Z_4 \quad (3.9)$$

where $$Z_4 = \frac{as + b}{s^2} \quad (3.10)$$

Rearranging $Z_4$ in product form $$Z = -\frac{1}{b}\left(\frac{as+b}{s}\right)\left(-\frac{b}{s}\right) \quad (3.11)$$

Let $$Z_5 = \frac{as+b}{s} \quad (3.12)$$

and $$Z_6 = -\frac{b}{s} \quad (3.13)$$

$Z_5$ and $Z_6$ are selected such that their equivalent parallel impedance is proportional to the product of their impedances, that is, $$\frac{Z_5 Z_6}{Z_5 + Z_6} = \frac{1}{a} Z_5 Z_6 \quad (3.14)$$

Thus $$Z_4 = -\frac{1}{b}Z_5 Z_6 = -\frac{a}{b}\frac{Z_5 Z_6}{Z_5 + Z_6} \quad (3.15)$$

From Equations 3.4 and 3.9 we obtain:

$$Z_2 = K_2 + K_2 Z_4 = K_2 + \frac{\left(-\frac{K_2 a}{b}Z_5\right)\left(-\frac{K_2 a}{b}Z_6\right)}{\left(-\frac{K_2 a}{b}Z_5\right) + \left(-\frac{K_2 a}{b}Z_6\right)} \quad (3.16)$$

Figure 4:
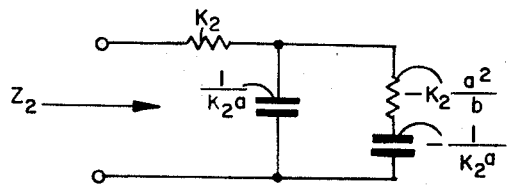
FIG. 4 is a schematic presentation of an equivalent circuit which may be used as part of the circuit of FIG. 3.

The equivalent circuit for Equation 3.16 is shown in FIG. 4.

Figure 5:
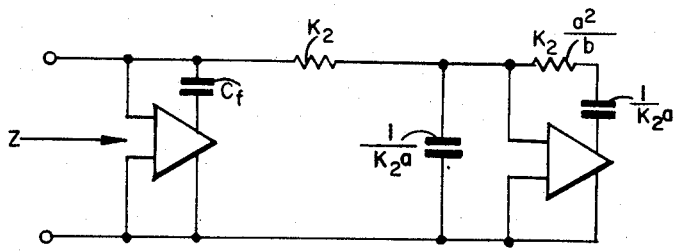
FIG. 5 is a combined passive and active circuit which may be used with the present invention.

The completed equivalent circuit for Z is shown in FIG. 5 and again in FIG. 1, where $$K_2 = \text{resistor } 55 = \frac{(1+K_d)Q}{(K-1)C_f \omega_o} \text{ ohms}$$

$$C_f = \text{capacitor } 54 = \frac{K_d C_e}{1+K_d} fd; \quad C_e = \left(\frac{N_1}{N_3}\right)^2 2C_0 fd$$

$$\frac{1}{K_2 a} = \text{capacitor } 56 = \frac{(K-1)C_f}{K_d + K} fd$$

$$K_2 \frac{a^2}{b} = \text{resistor } 58 = \frac{(K_d + K)^2}{(K-1)(1+K_d)C_f \omega_o Q} \text{ ohms}$$

$$\frac{1}{K_2 a} = \text{capacitor } 59 = \frac{(K-1)C_f}{K_d + K} fd$$

and the negative impedance converters 53 and 57 provide for the negative signs in Equations 3.16 and 2.10.

In practice, the following real values were used:

Resistor 55=6.05 K ohms,
Resistor 58=183 ohms,
Capacitor 54=.18 μfd.
Capacitor 56=.0074 μfd.
Capacitor 59=.0074 μfd.

The gain of amplifiers 53 and 57=+2; $\omega_o$=20 kc. $(2\pi)$.

Independent adjustment of stiffness and damping is achieved by varying the values of $K_d$ for stiffness and K for damping.

Although the invention has been described and illustrated in detail it is to be understood that the same is by way of illustration and example only and is not to be taken by way of limitation, the spirit and scope of this invention being limited only by the terms of the appended claims.

I claim:
1. An electrostatic support system for supporting a member between a pair of electrodes comprising in combination:
   electrostatic support circuit establishing an alternating potential between said member and said electrodes for electrostatically supporting said member;
   sensing means providing an alternating signal indicative of the displacement of said member from a centered position between said pair of electrodes; and
   impedance means responsive to said alternating signal and providing a signal to said electrostatic support circuit varying said alternating potential between said member and said electrodes so as to effect substantial centering of said member between said pair of electrodes.

2. The electrostatic support system of claim 1 wherein said provided signal of said impedance means is reflected through said sensing means to said electrostatic support circuit.

3. The electrostatic support system of claim 2 wherein said sensing means is a transformer having a primary and a secondary winding, the primary winding of said transformer connected to said electrodes so as to sense the current flow between said electrodes and said supported member, the secondary of said transformer connected to said impedance means.

4. The electrostatic support system of claim 1 wherein said impedance means is a negative impedance.

5. The electrostatic support system of claim 4 wherein said negative impedance is generated by negative impedance converters.

6. The electrostatic support system of claim 3 wherein said impedance means comprises a first amplifying means connected across said transformer secondary winding, a first capacitor connected from the output to the input of said amplifying means, a second amplifying means connected across said transformer secondary winding, a second capacitor connected in series with a resistor from the output to the input of said second amplifier means, said amplifying means converting the values of said resistors and capacitors to negative values.

7. The support system of claim 1 wherein said impedance means is a lead compensation network having a negative transfer impedance.

References Cited

UNITED STATES PATENTS 3,262,325  7/1966  Senstad _____ 308—10
3,262,326  7/1966  Schott _____ 308—10

J. D. MILLER, *Primary Examiner.*

L. L. SMITH, *Assistant Examiner.*